United States Patent

[11] 3,633,051

[72] Inventors Meyer Press
Sharon;
James F. Teixeira, Sudbury; Gerald Wolff, Framingham, all of Mass.
[21] Appl. No. 115,528
[22] Filed Feb. 16, 1971
[45] Patented Jan. 4, 1972
[73] Assignee GTE Sylvania Incorporated

[54] TRANSISTORIZED LOAD CONTROL CIRCUIT
5 Claims, 1 Drawing Fig.

[52] U.S. Cl. .......... 307/296, 307/242, 307/253, 307/254
[51] Int. Cl. .......... H03k 17/00
[50] Field of Search .......... 307/242, 243, 296, 297; 328/213

[56] References Cited

UNITED STATES PATENTS 3,192,403 6/1965 Bernfeld et al. .......... 307/296 X

*Primary Examiner*—Donald D. Forrer
*Assistant Examiner*—B. P. Davis

*Attorneys*—Norman J. O'Malley, Elmer J. Nealon and Peter Xiarhos

ABSTRACT: A transistorized load control circuit including first and second transistors for supplying current to a load circuit from a high-voltage source or from a low-voltage source. The base of the first transistor is connected to an input terminal, the collector is connected to the high-voltage source, and the emitter is connected through a resistance to the base of the second transistor and also through first and second series-connected diodes to the emitter of the second transistor. The collector of the second transistor is connected through a third diode to the low-voltage source and the emitter is connected to a load circuit. When a predetermined first control voltage condition is present at the input terminal, current is supplied to the load circuit from the low-voltage source via a current path including the third diode and the second transistor. When a predetermined second control voltage condition is present at the input terminal, current is supplied to the load circuit from the high-voltage source via a current path including the first transistor and the first and second diodes. During operation of the load control circuit, the base-emitter circuit of the second transistor is prevented from receiving and conducting excessive values of current.

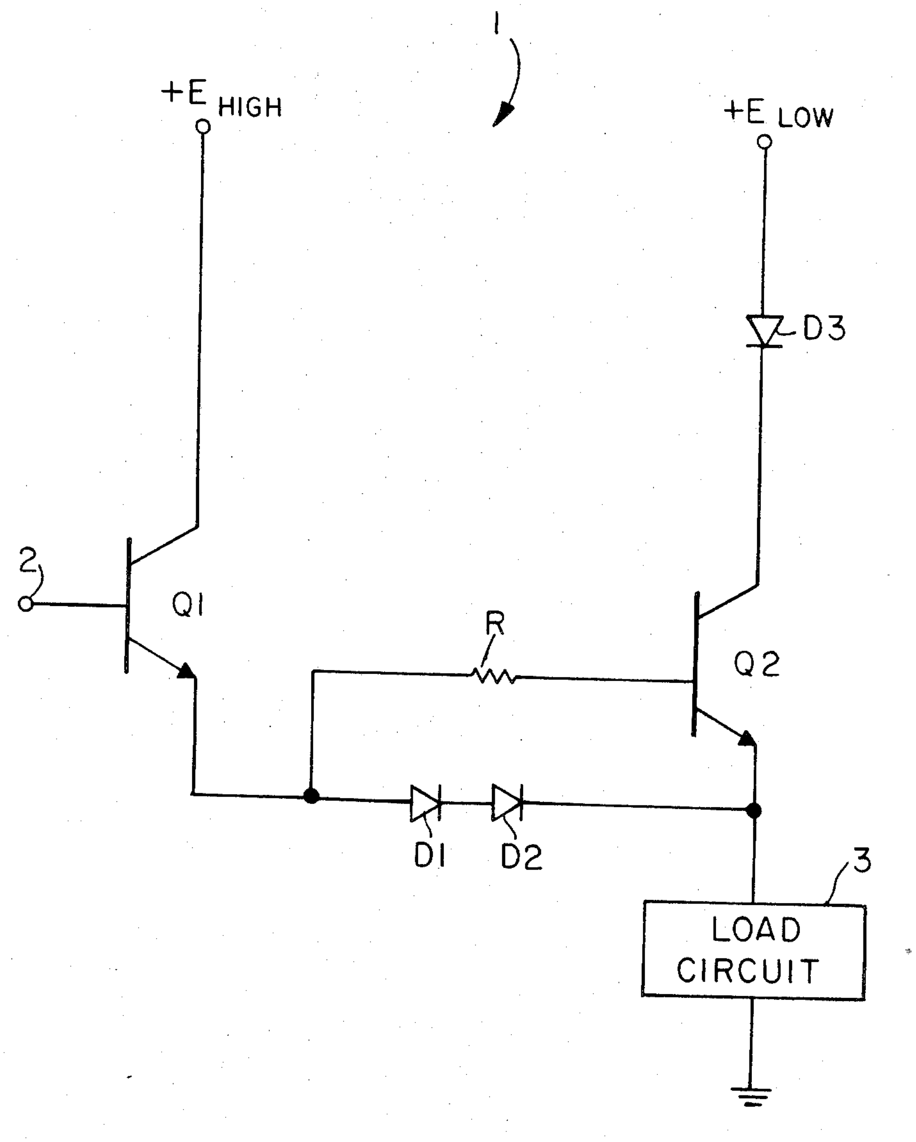
*INVENTORS*
MEYER PRESS
JAMES F. TEIXEIRA
GERALD WOLFF

TRANSISTORIZED LOAD CONTROL CIRCUIT

BACKGROUND OF THE INVENTION

The present invention relates to a load control circuit. More particularly, it is concerned with a simple and inexpensive transistorized load control circuit for supplying current to a load circuit from either a first voltage source or a second voltage source.

It is often desirable or required to supply current to a load circuit from a first voltage source, for example, a low-voltage source, and, at a predetermined time, from a second voltage source, for example, a high-voltage source. Although a variety of circuits and arrangements capable of performing the above general or equivalent function are generally available and known to those skilled in the art, for example, so-called "voltage-on-demand" circuits, they are often undesirably complex, slow in operation, inefficient, or costly. The present invention is directed to a load control circuit which avoids the above-mentioned disadvantages and shortcomings associated with prior art load control circuits and arrangements.

BRIEF SUMMARY OF THE INVENTION

In accordance with the present invention, a load control circuit is provided for supplying current to a load circuit from a first source of potential or from a second source of potential. The load control circuit includes a first transistor and a second transistor. The base of the first transistor is coupled to an input terminal of the load control circuit and the collector is coupled to the first source of potential. A resistance is connected in series with the emitter of the first transistor and the base of the second transistor, and a first diode means, having a conducting state and a nonconducting state, is connected in series with the emitter of the first transistor and the emitter of the second transistor. A second diode means, also having a conducting state and a nonconducting state, is connected in series with the collector of the second transistor and the second source of potential. A load circuit to be operated by the load control circuit is connected in series with the emitter of the second transistor and a source of reference potential.

In the operation of the load control circuit, the second transistor operates in a conducting state, the second diode means operates in its conducting state, and the first diode means operates in its nonconducting state in response to a first input control voltage condition at the input terminal. With the above operating states for the second transistor and the first and second diode means, current is supplied from the second source of potential to the load circuit via the conducting second diode means and the conducting second transistor. In response to a second input control voltage condition at the input terminal, the first transistor operates in a conducting state, the first diode means operates in its conducting state, and the second diode means operates in its nonconducting state. With these particular operating states for the first transistor and the first and second diode means, current is supplied from the first source of potential to the load circuit via the conducting first transistor and the conducting first diode means.

BRIEF DESCRIPTION OF THE DRAWING

The single figure of the drawing illustrates a transistorized load control circuit in accordance with a preferred embodiment of the invention.

GENERAL DESCRIPTION OF THE INVENTION

Referring now to the single figure of the drawing, there is shown a load control circuit 1 in accordance with a preferred embodiment of the invention. The load control circuit 1 generally comprises a pair of NPN-transistors Q1 and Q2, a positive high-voltage source $+E_{HIGH}$, a positive low-voltage source $+E_{LOW}$, a resistor R, and diodes D1, D2, and D3. The base of the transistor Q1 is connected directly to an input control terminal 2 to which a control voltage is applied for operating the load control circuit 1. The collector of the transistor Q1 is connected directly to the positive high-voltage source $+E_{HIGH}$, and the emitter is coupled to the base of the transistor Q2 through the resistor R and also to the emitter of the transistor Q2 through the diodes D1 and D2. As indicated in the figure, the diodes D1 and D2 are poled for easy current flow in the forward-bias direction with the anode of the diode D1 being connected to the emitter of the transistor Q1, the cathode of the diode D1 being connected to the anode of the diode D2, and the cathode of the diode D2 being connected to the emitter of the transistor Q2. In addition to the above circuit connections, the collector of the transistor Q2 is connected to the cathode of the diode D3, the anode of which is connected to the positive low-voltage source $+E_{LOW}$, thereby establishing a direction of easy current flow between the low-voltage source $+E_{LOW}$ and the collector of the transistor Q2. A load circuit 3 to be operated by the load control circuit 1 is connected between the emitter of the transistor Q2 and ground potential.

By way of example of a typical application of the load control circuit 1 of the invention, the load circuit 3 may include a series arrangement of an inductive load element and a resistive load element as is commonly employed, for example, in magnetic deflection circuits for cathode-ray tubes.

OPERATION

In the operation of the load control circuit 1, a positive control voltage for causing the load control circuit 1 to supply current to the load circuit 3 from either the low-voltage source $+E_{LOW}$ or the high-voltage source $+E_{HIGH}$ is applied to the input control terminal 2. The particular one of the two voltage sources $+E_{LOW}$ and $+E_{HIGH}$ which it is desired to supply current to the load circuit 3 is determined by the value of the control voltage established at the input control terminal 2. More specifically, and as will be described more fully hereinafter, if it is desired to supply current to the load circuit 3 from the low-voltage source $+E_{LOW}$, a value of control voltage is established at the input control terminal 2 which is sufficient to forward bias the base-emitter junctions of both of the transistors Q1 and Q2 (typically more than 1.4 volts) but, as may be determined from the figure, less than $$e_c = e_{+E\,LOW} + e_{beQ1} + e_{bcQ2} - e_{D3},$$

where $e_{+E\,LOW}$ is the value of the low-voltage source $+E_{LOW}$, $e_{beQ1}$ is the value of the forward-bias base-emitter voltage of the transistor Q1 (typically 0.7 volts), $e_{bcQ2}$ is the forward-bias base-collector voltage of the transistor Q2 (typically 0.7 volts), and $e_{D3}$ is the forward-bias voltage of the diode D3 (typically 0.7 volts). (Thus, the expression $(+e_{beQ1}+e_{bcQ2}-e_{D3})$ typically has a value of 0.7 volts). If it is desired to supply current to the load circuit 3 from the high-voltage source $+E_{HIGH}$ instead of the low-voltage source $+E_{LOW}$, a value of control voltage is established at the input control terminal 2 which is equal to or greater than $e_c$. A more detailed explanation of the "low-voltage" and "high-voltage" operation of the load control circuit 1 is as follows.

LOW-VOLTAGE OPERATION

To supply current to the load circuit 3 from the low-voltage source $+E_{LOW}$, a positive control voltage is established at the input control terminal 2 having a value sufficient to forward bias both of the transistors Q1 and Q2 into their conducting states but, as stated hereinabove, less than $$e_c = e_{+E\,LOW} + e_{beQ1} + e_{bcQ2} - e_{D3}.$$

The minimum value of control voltage required to achieve conduction in both of the transistors Q1 and Q2 is slightly greater than the combined values of the forward-bias base-emitter voltages of the transistors Q1 and Q2, typically 1.4 volts. With the transistor Q1 and Q2 operating in their conducting states, the diode D3 is forward biased into its conducting state and current is supplied from the low-voltage source $+E_{LOW}$ through the diode D3 and the conducting transistor Q2 into the load circuit 3. It is to be noted that no current is supplied to the load circuit 3 via the diodes D1 and D2 inasmuch as the voltage appearing across the diodes D1 and D2 at this time (due to the current flow through the resistor R) is insufficient to forward bias the diodes D1 and D2 into their conducting states. Thus, the current supplied to the load circuit 3 during "low-voltage" operation is derived from the low-voltage source $+E_{LOW}$.

HIGH-VOLTAGE OPERATION

To supply current to the load circuit 3 from the high-voltage source $+E_{HIGH}$, a positive control voltage is established at the input control terminal 2 having a value of equal to or greater than the value $e_c$. Assuming a value of control voltage equal to or greater than $e_c$, both of the transistors Q1 and Q2 are forward biased in their conducting states, the diodes D1 and D2 are forward biased into their conducting states, and the diodes D3 is caused to be reverse biased by the forward-biased base-collector junction of the conducting transistor Q2. As a result, the low-voltage source $+E_{LOW}$ is prevented by the reverse-biased diode D3 from supplying current to the load circuit 3, and current is now supplied to the load circuit 3 from the high-voltage source $+E_{HIGH}$ via a current path including the conducting transistor Q1 and the conducting diodes D1 and D2. The value of the resistor R is selected such that for a value of control voltage equal to $e_c$ the combined values of the voltage across the resistor R and the voltage across the base-emitter junction of the transistor Q2 to equal to the combined values of the forward-bias voltages of the diodes D1 and D2, typically 1.4 volts, thereby forward biasing the diodes D1 and D2 into their conducting states and initiating current flow from the high-voltage supply $+E_{HIGH}$ into the load circuit 3. If the value of control voltage is increased above $e_c$, the combined values of the voltage across the resistor R and the voltage across the base-emitter junction of the transistor Q2 becomes greater than the combined values of the forward-bias voltages of the diodes D1 and D2, thereby causing increased current to be supplied to the load circuit 3 from the high-voltage source $+E_{HIGH}$ via the diodes D1 and D2. This latter mode of operation involving the diodes D1 and D2 is significant inasmuch as the diodes D1 and D2 serve to limit the current through the base-emitter junction of the transistor Q2 to a safe value by diverting most of the current supplied by the high-voltage source $+E_{HIGH}$ away from the base-emitter junction of the transistor Q2, thereby protecting the base-emitter junction of the transistor Q2.

Some typical values for the parameters of the components employed in the above-described load control circuit 1 are as follows:

| | |
|---|---|
| $+E_{HIGH}$ | 50 volts DC |
| $+E_{LOW}$ | 10 volts DC |
| Q1 | 2N 3055 |
| Q2 | 2N 3055 |
| R | 10 ohms |
| D1 | 1N 4383 |
| D2 | 1N 4383 |
| D3 | 1N 4383 |

While there has been shown and described what is considered a preferred embodiment of the invention, it will be obvious to those skilled in the art that various changes and modifications may be made therein without departing from the invention as called for in the appended claims.

What is claimed is:

1. A load control circuit for operating a load circuit, comprising:
   an input terminal for receiving input control voltage conditions;
   a first source of potential;
   a second source of potential;
   a source of reference potential;
   a first transistor having base, collector, and emitter, the base being coupled to the input terminal and the collector being coupled to the first source of potential;
   a second transistor having base, collector, and emitter;
   a resistance connected in series with the emitter of the first transistor and the base of the second transistor;
   first diode means connected in series with the emitter of the first transistor and the emitter of the second transistor, said first diode means having a conducting state and a nonconducting state;
   second diode means coupled in series with the collector of the second transistor and the second source of potential, said second diode means having a conducting state and a nonconducting state;
   means for connecting a load circuit in series with the emitter of the second transistor and the source of reference potential;
   said second transistor being operable in a conducting state, said second diode means being operable in its conducting state, and said first diode means being operable in its nonconducting state in response to a first input control voltage condition at the input terminal, whereby current is supplied from the second source of potential to the load circuit via the conducting second diode means and the conducting second transistor; and
   said first transistor being operable in a conducting state, said first diode means being operable in its conducting state, and said second diode means being operable in its nonconducting state in response to a second input control voltage condition at the input terminal, whereby current is supplied from the first source of potential to the load circuit via the conducting first transistor and the conducting first diode means.

2. A load control circuit in accordance with claim 1 wherein:
   the first input control voltage condition forward biases the base-emitter junction of the second transistor; and
   the second input control voltage condition forward biases the base-emitter junction of the first transistor, the first diode means, and the base-collector junction of the second transistor.

3. A load control circuit in accordance with claim 1 wherein:
   the first source of potential is a positive high-voltage source;
   the second source of potential is a positive low-voltage source;
   the source of reference potential provides a potential which is negative with respect to the low-voltage source;
   the first and second transistors are NPN-transistors;
   the first diode means comprises a pair of series-connected diodes, the anode of the first one of the pair of diodes being coupled to the emitter of the first transistor, the cathode of the first one of the pair of diodes being coupled to the anode of the second one of the pair of diodes, and the cathode of the second one of the pair of diodes being coupled to the emitter of the second transistor; and
   the second diode comprises a diode having its anode coupled to the second source of potential and its cathode coupled to the collector of the second transistor.

4. A load control circuit for operating a load circuit, comprising:
   an input terminal for receiving input control voltages;
   a high-voltage source;
   a low-voltage source;
   a source of reference potential;
   a first transistor having base, collector, and emitter, the base being connected directly to the input terminal and the collector being connected directly to the high-voltage source;
   a second transistor having base, collector, and emitter;
   a resistance connected in series with the emitter of the first transistor and the base of the second transistor;
   first and second diodes connected in series between the emitter of the first transistor and the emitter of the second transistor, said first and second diodes being poled for easy current flow between the emitter of the first transistor and the emitter of the second transistor;

a third diode connected in series with the collector of the second transistor and the low-voltage source, said third diode being poled for easy current flow between the low-voltage source and the collector of the second transistor;

means for connecting a load circuit in series with the emitter of the second transistor and reference potential;

said resistance having a value selected such that for a control voltage at the input terminal having a value at least equal to the forward-bias base-emitter voltages of the first and second transistors—but less than the value of the low-voltage source, plus the value of the forward-bias base-emitter voltage of the first transistor, plus the value of the base-collector voltage of the second transistor, minus the value of the forward-bias voltage of the third diode—the second transistor and the third diode operate in their conducting states and the first and second diodes operate in their nonconducting states, whereby current is supplied from the low-voltage source to the load circuit via the conducting third diode and the conducting second transistor, and such that for a control voltage at the input terminal having a value equal to or greater than the value of the low-voltage source, plus the value of the forward-bias base-emitter voltage of the first transistor, plus the value of the base-collector voltage of the second transistor, minus the value of the forward-bias voltage of the third diode, the first transistor and the first and second diodes operate in their conducting states and the third diode operates in its nonconducting state, whereby current is supplied from the high-voltage source to the load circuit via the conducting first transistor and the conducting first and second diodes.

5. A load control circuit in accordance with claim 4 wherein:

the high-voltage and low-voltage sources are positive voltage sources;

the reference potential is ground potential; and the first and second transistors are NPN-transistors.

* * * * *